Oct. 28, 1924. 1,513,360
E. ABLAHADIAN
TEST TUBE FOR CLINICAL AND BACTERIOLOGICAL LABORATORIES
Filed Oct. 13, 1923
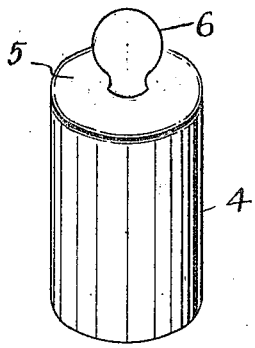
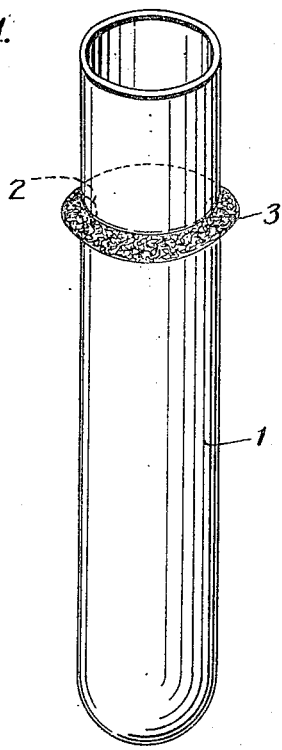
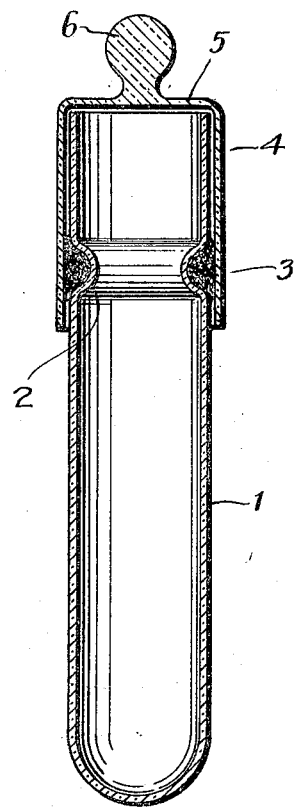
INVENTOR
Eleeza Ablahadian,
BY
ATTORNEY Patented Oct. 28, 1924.

1,513,360

UNITED STATES PATENT OFFICE.

ELEEZA ABLAHADIAN, OF GLENDALE, CALIFORNIA.

TEST TUBE FOR CLINICAL AND BACTERIOLOGICAL LABORATORIES.

Application filed October 13, 1923. Serial No. 668,439.

*To all whom it may concern:*

Be it known that I, ELEEZA ABLAHADIAN, a citizen of Armenia, residing at Glendale, in the county of Los Angeles and State of California, have invented certain new and useful Improvements in Test Tubes for Clinical and Bacteriological Laboratories, of which the following is a specification.

This invention relates to chemical apparatus, but is more particularly concerned with a novel form of test-tube for use in clinical and bacteriological laboratories for bacteria culture.

As customarily constructed, a test-tube is provided with a cotton plug removably closing the open end thereof, for the purpose of preventing bacteria entering the tube and affecting the culture. With this usual form of test-tube, when the test-tube has to be opened the bacteriologist singes the cotton plug on the outside, then takes it out, either introduces new bacteria into the tube or takes out a sample of the bacteria in the tube with a platinum rod, then singes the cotton again in a Bunsen flame, sterilizes the top of the culture tube, and replaces the cotton plug.

While it is possible to keep cultures or media sterile in this way, there is always a great risk of contamination every time the cotton is taken out and replaced, because it is difficult to singe it properly. Often the technician will accidentally drop the cotton, or will hold it too long in the flame so that it ignites and is consumed, resulting, also, in burning his fingers. Moreover, the edge of the tube is liable to become wet, so that the cotton sticks to it, making it difficult and troublesome for the technician to remove the cotton plug.

To overcome these difficulties, incident to the use of a test-tube as ordinarily constructed, I devised the test-tube forming the subject-matter of this invention, and which I call "The Ablahadian culture-tube."

The accompanying drawing illustrates the preferred form of my test-tube. In the drawing:

Fig. 1 is a perspective view of the culture or test-tube with the cap shown removed; and Fig. 2 is a central longitudinal sectional view thereof, the cap being shown in position on the tube.

Referring, now, in detail to the drawing:

1 designates a tube having the lower end thereof closed as shown, and the upper end open. Toward the top of the tube, the tube is provided with a circumferential groove 2, in which a length of cotton may be wound, so as to form a ring-like, compressible body 3.

Telescoping over the upper end of the tube is a cap 4, having an upper closed end 5 with, preferably, a handle 6.

When the culture tube is being prepared for use, both the tube 1 and the cap 4 are thoroughly cleansed, then a piece of cotton is snugly wound around the tube in the groove 2, leaving the cotton bulging beyond the periphery of the tube, as shown in Fig. 1. Then the cap 4 is slid over the top of the culture-tube 1 and over the ring-shaped cotton body 3, thereby compressing the cotton as shown in Fig. 2. The test-tube is now completely sterilized by the application of heat thereto. As an incidental result of such sterilization, the cotton cakes around the groove, so that, when the cap 4 is removed, the cotton will remain in the groove. Now, with the cap 4 removed, the technician holds the culture-tube 1 above a Bunsen flame and singes the cotton body 3 by revolving the tube 1; the cap 4 is also passed through the flame to sterilize the exposed lower edge of the same, and then replaced on the culture-tube 1, the lower edge of such cap (which edge has just been sterilized as described) passing over the sterilized cotton 3 in the groove 2.

Thus, it will be seen that, by reason of the construction of my test-tube, the cotton, when once in place, is never handled (as is necessarily the case with the usual removable cotton-plug closing the open end of the usual form of tube), and the mouth of the tube 1 and the mouth of the cap 4 can be easily and quickly sterilized, saving time and eliminating the possibility of accidental dropping and contamination of the cotton; avoiding the dropping of cotton flakes down into the culture in the tube 1 (as happens when the ordinary cotton plug or stopper is used, projected into the tube at the top thereof); and avoiding the sticking of cotton to the mouth of the tube, as happens when the usual cotton plug is used.

Having thus fully shown and described my invention, what I claim as new and desire to secure by Letters Patent is:

1. Chemical apparatus for bacteria culture in clinical and bacteriological laboratories, comprising the combination of a tube having a circumferential groove toward the top thereof, a cap removably disposed over the open end of said tube and over said groove, and cotton disposed in said groove and compressed by said cap.

2. The method of assembling cotton in the circumferential groove of a test-tube, which consists in winding a length of cotton around said groove, then placing a cap on said tube over said cotton so wound, to hold the cotton temporarily in said groove, then applying sterilizing heat to said cap to cause said cotton to cake and adhere to said groove, so that the cotton remains in place in said groove when the cap is removed.

ELEEZA ABLAHADIAN.